United States Patent

Ramamurthy et al.

[11] Patent Number: 5,854,458
[45] Date of Patent: Dec. 29, 1998

[54] STALK MOUNTED THREE FUNCTION SWITCH ASSEMBLY HAVING A SINGLE MULTIPLEXED OUTPUT

[75] Inventors: Rajkumar Ramamurthy, Keokuk, Iowa; Robert A. Buenzow, Hamilton; James K. Pettit, Carthage, both of Ill.

[73] Assignee: Methode Electronics, Inc., Chicago, Ill.

[21] Appl. No.: 811,432

[22] Filed: Mar. 3, 1997

[51] Int. Cl.$^6$ ...................................................... H01H 9/00
[52] U.S. Cl. ..................................... 200/61.54; 200/61.27
[58] Field of Search ......................... 200/4, 61.27, 61.3, 200/61.54, 5 R, 339; 307/10.1–10.8

[56] References Cited

U.S. PATENT DOCUMENTS

| | | | |
|---|---|---|---|
| 4,723,057 | 2/1988 | Lane, Jr. ............................... | 200/61.27 |
| 4,849,585 | 7/1989 | Vidican et al. ....................... | 200/61.54 |
| 5,581,058 | 12/1996 | Javery et al. ............................... | 200/4 |
| 5,610,378 | 3/1997 | Du Rocher et al. ................. | 200/61.54 |
| 5,646,385 | 7/1997 | Bogovican et al. .................. | 200/61.27 |

*Primary Examiner*—J. R. Scott
*Attorney, Agent, or Firm*—David L. Newman

[57] ABSTRACT

A multi-function switch assembly is provided for mounting to the end of a tubular member. The switch assembly provides control information to external devices via control wires contained within within the tubular member. The switch assembly includes a housing defining at least one internal cavity for mounting switch components therein, and also defining an internal bore configured to receive the tubular member. The internal bore communicates with the internal cavity, allowing the control wires to enter the housing. First, second, and third switches are mounted within the internal cavity defined by the housing. A rotating switch actuator actuates the first and second switches which are positioned such that when the rotating actuator is rotated in a first angular direction, the first switch is actuated, and when the first rotating actuator is rotated in a second opposite angular direction, the second switch is actuated. A linear switch actuator actuates the third switch. The first, second, and third switches are electrically connected to output generating circuitry which generates an output signal from which the open or closed state of each contact can be determined.

14 Claims, 5 Drawing Sheets

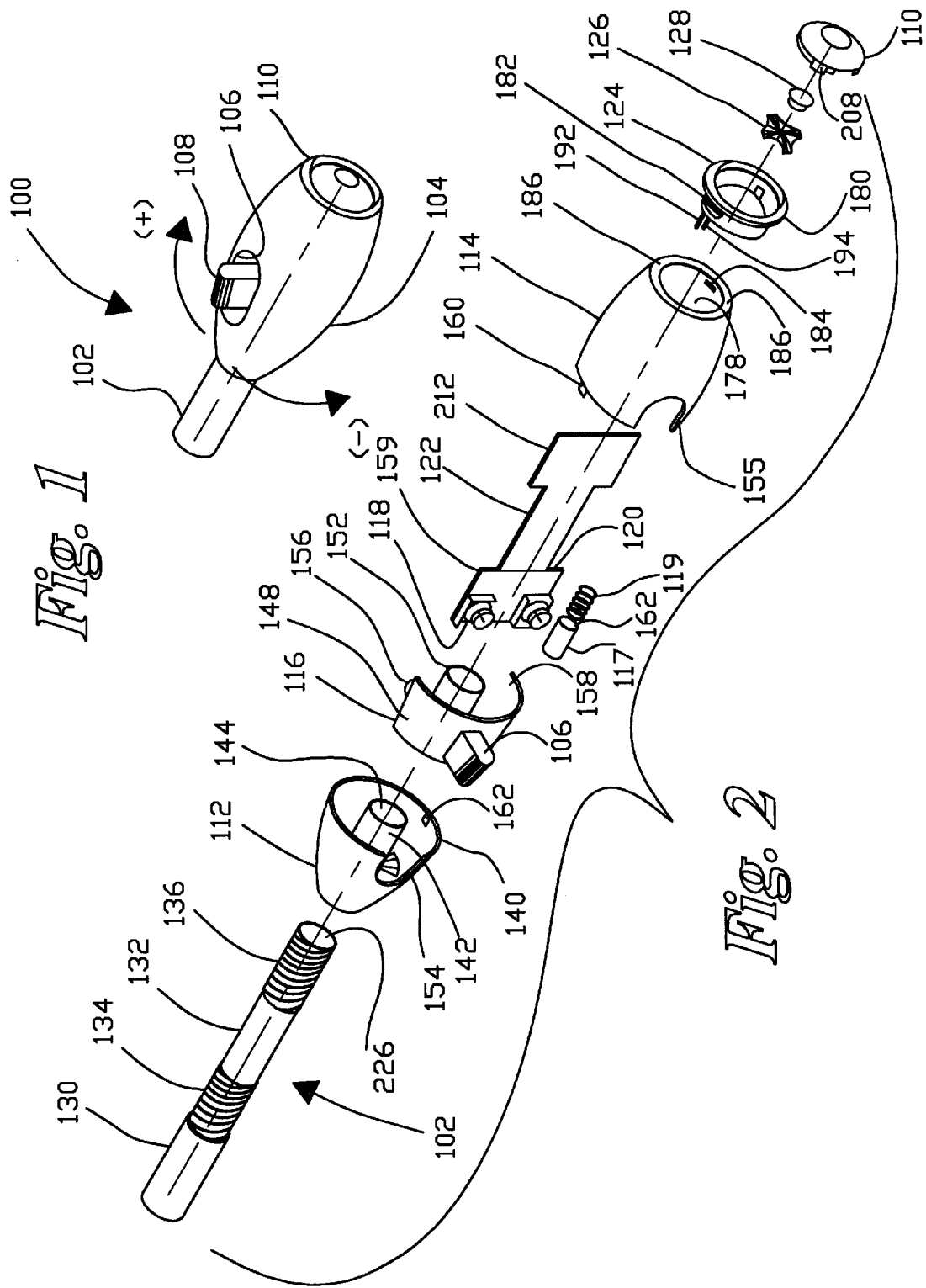

STALK MOUNTED THREE FUNCTION SWITCH ASSEMBLY HAVING A SINGLE MULTIPLEXED OUTPUT

BACKGROUND OF THE INVENTION

The present invention relates to an improved multi-contact switch assembly for use in automobiles. The switch assembly is configured to mount to the end of a stalk or lever style operator extending from a car's steering column. A pair of signal wires carry a multiplexed control signal to remote regions of the vehicle, providing information concerning the state of the various contacts within the switch assembly.

Modern automobiles include a number features requiring driver activation. Operators for many basic functions such as turn signals, light switches, automatic or manual transmission gear shift levers, heater and defroster controls, as well as more advanced functions such as cruise control, power mirrors, and the like, must be within easy reach of the driver, and easily manipulated by such so as to not distract the driver from the primary task of controlling the vehicle. Steering column mounted turn signal levers, and gear shift levers have been employed on cars for generations. However, as the number of features available on newer car models increases, dashboard space for the additional operators needed to activate these features becomes more and more crowded. Too many operators located within a small area on the dashboard can cause problems in that a driver's attention may be diverted from the road while searching for the correct operator to activate a desired function.

A solution to this problem which automobile manufacturers have come to rely on has been to mount operators on the ends of stalks extending from the steering column. Thus, manufacturers now mount switch assemblies to turn signal levers, gear shift stalks, or other non-traditional stalks which have been added to the steering column. This solution provides operators which are in easy reach of the driver, are easily located, and easily manipulated. On the other hand, this solution generates problems for designers who must package reliable operators in small stalk mounted housings. In addition to being small, the operator assemblies must be designed to be easily manipulated by the driver of the automobile, without requiring the driver's full attention.

An example of an advanced feature found on newer cars requiring additional operators is automatic transmissions having an electronic override feature which allows the driver to increase or decrease the torque output of the transmission by operating an electrical switch rather than by shifting gears. This features combines the advantages and convenience of an automatic transmission with a measure of the control over the output torque and acceleration rate found in manual transmissions. Transmissions including electronic override will generally require three switch contacts and associated signals to implement this feature. For convenience these switches and signals will be referred to herein as AUTO(+), AUTO(−), and O/D (Over Drive), though various manufacturers may apply different names to these signals or other signals serving a similar functions. A contact closure of the AUTO(+) switch indicates that the driver is requesting greater torque output from the transmission, and likewise, a contact closure of the AUTO(−) switch indicates that driver desires less torque output from the transmission. Finally, a closure of the O/D switch contact indicates that the driver is invoking or revoking the over drive feature. In addition to the AUTO(+), AUTO(−), and O/D signals, many such systems will require a fourth DIAGNOSTIC signal to indicate that the switch assembly is installed and that the override feature is available.

In an automobile or other vehicle employing an automatic transmission with this type of electronic override feature, provision must be made for mounting the operators for actuating the AUTO(+), AUTO(−) and O/D switches within easy reach of the driver. Since the signals are part of the transmission control system, a logical placement of the operators would be on or near the gear shift lever which operates the automatic transmission. If the gear shift lever is to mounted on the steering column, a stalk mounted three function switch is required, thus giving rise to the need for the stalk mounted multifunction switch of the present invention.

Implementing such a switch, however, is not without difficulty. The physical and operational requirements of the gearshift stalk create design limitations for any switch assembly that is to be mounted to the end of the stalk. The gearshift stalk itself is a narrow rigid tubular member coupled to a rotating collar incorporated within the steering column. A driver engages the transmission by rotating the stalk/collar assembly either clockwise or counter clockwise until the proper driving mode (e.g. Park, Reverse, Neutral, Drive) has been engaged. Signal wires attached to the a switch assembly located at the end of the gearshift stalk must pass the through the inner diameter of the stalk, and must be able to flex as the stalk and collar assembly is rotated about the steering column. Another consideration is that the switch assembly must be housed in a small package which can be incorporated as part of the rigid stalk itself. When changing driving modes, the driver must be able to grasp the switch housing and manipulate the gearshift stalk to place the vehicle in the proper driving mode. In other words, the switch assembly must form a rigid extension of the gearshift stalk in a manner which allows the driver easily change driving modes. A final consideration is that the switch operators must be easily located, differentiated, and manipulated so that the various functions can be invoked easily and with confidence that the correct action is being taken.

As the above discussion makes clear, a need exists for a stalk mounted multi-function switch assembly providing contact closure indication for three separate switch contacts. In the automatic transmission override application described above, it is advantageous to provide a single multiplexed output indicating which switch contact has been activated. Multiplexing the signals allows all of the necessary data to be transferred from the switch assembly over a small number of signal wires. Furthermore, it would also be beneficial to provide a signal indication that the multi-function switch has been installed, and is properly connected. The present invention as disclosed herein provides such a switch assembly.

While the background discussed herein has been mainly related to the need for a multifunction switch assembly for use in conjunction with an automatic transmission electronic override application, it should be clear that a stalk mounted multi-function switch could be applied to any number of other control functions within an automobile. Signal wires carrying contact closure information can be connected to any system requiring such information. Therefore, the present invention, the preferred embodiment of which applies to an automatic transmission electronic override application, should not be considered as limited use only in connection with such an automatic transmission system. One of ordinary skill in the art could easily adapt the preferred embodiment without an undue amount of experimentation for use with systems within the vehicle other than the transmission, or for locating the switch assembly on operators other than a gearshift stalk.

SUMMARY OF THE INVENTION

To meet the requirements outlined above, one of the main objectives of the present invention is to provide a multi-contact switch assembly for use in automotive applications configured to mount on a stalk style control function operator extending from a steering column.

A further object of the present invention is to provide a switch assembly having a housing which can be incorporated into the structure of the stalk such that the stalk and the housing can be manipulated as a unit.

Another objective of the present invention is to provide a multi-function switch assembly including three independently operated switch contacts, the housing including operators for actuating the switch contacts which are easily distinguished one from another, and can be easily operated by the driver of the vehicle incorporating the multi-function switch assembly.

Still another objective of the present invention is to provide a stalk mounted multi-function switch assembly having a single multiplexed output signal providing information on the status of all switch contacts within the assembly simultaneously.

Yet another objective of the present invention is to provide a stalk mounted multi-function switch assembly having a single multiplexed output signal wherein particular signal current levels represent particular switch contact closures.

An additional objective of the present invention is to provide a gearshift stalk mounted three function switch assembly for use in conjunction with an automatic transmission electronic override system, the switch assembly providing separate switch contact closures indicating that a driver has requested AUTO(+), AUTO(−), or O/D.

A further objective of the present invention is to provide a gearshift stalk mounted three function switch assembly for use in conjunction with an automatic transmission electronic override system wherein the switch assembly provides a single multiplexed signal to a transmission controller, the multiplexed signal providing four separate output current levels, a first current level indicating that none of the three switch contacts have been actuated; a second current level indicating that the AUTO(+) contact has been actuated; a third current level indicating that the AUTO(−) contact has been actuated; and a fourth current level indicating that the O/D contact has been actuated.

All of these objectives, as well as others that will become apparent upon reading the detailed description of the presently preferred embodiments of the invention below, are met by the stalk mounted three function switch assembly having a single multiplexed output as herein disclosed.

The present invention provides a three function switch assembly configured to mount to the end of a control stalk extending from the steering column of an automobile. As noted, in the preferred embodiment of the invention the switch contacts are used to send signals to an automatic transmission to either increase or decrease the torque output of the transmission, or to shift into overdrive. Of course the signals output from the switch assembly can perform any other purpose as well. And while the discussion herein refers to transmission related signals, the switch assembly of the present invention should not be considered limited to use in conjunction automatic transmissions only.

In the preferred embodiment the switch mechanism is housed within an oblong tubular housing having an axial bore formed lengthwise through the housing. The axial bore is configured to receive a gearshift operator or stalk insertable therein. A knurled portion of the stalk forms and interference fit with the axial bore to firmly hold the switch housing in place once the stalk has been inserted into the bore. When properly assembled, the stalk extends nearly the entire length of the housing such that the housing generally forms an outer wrap around the stalk, such that the stalk and the switch housing can be manipulated together as a unit without creating any damaging stresses between the housing and the stalk. The actual switch mechanism is contained in a hollow region between the axial bore and the outer diameter of the housing.

The preferred embodiment provides AUTO(+) and AUTO(−) switches, each activated by an opposing motion of a modified rocker switch. A thumb operated lever extends from the modified rocker through an opening in the outer wall of the switch housing. The modified rocker switch is generally semicircular in shape, with a ring like member that wraps around the axial bore of the housing. Pressing the thumb lever up or down causes the modified rocker switch to rotate clockwise or counter clockwise around the gearshift stalk. The truncated portion of the semicircular modified rocker switch forms upper and lower shoulders. The shoulders are configured to engage water tight or water resistant electrical switch elements located within the housing behind the shoulders. When the thumb lever is pressed upward, the modified rocker switch rotates clockwise and the upper shoulder depresses the upper electrical switch element, closing the switch contact, and thereby electrically connecting the two wire leads attached thereto. When the thumb lever is pressed downward, the modified rocker switch rotates counter clockwise and the lower shoulder depresses the lower electrical switch element, closing the switch contact and electrically connecting another pair of wire leads attached to the lower electrical switch element. Thus, the thumb lever provides actuation of two separate switch contacts in an easily distinguishable manner. Movement of the lever in one direction closes a first contact, and movement of the lever in the other direction closes a second contact. A spring loaded detent mechanism engages a profiled surface of the modified rocker switch, giving the thumb lever a mechanical snapping feel when the switch is actuated.

A separate O/D switch element is located at the axial end of the switch housing forming an aesthetic appearance as well as a switching function. A stationary contact housing is insertable into a hollowed out recess at the end of the housing. Formed within the stationary contact housing are a pair of stationary contacts. A domed moving contact is located in spaced relation to the two stationary contacts. The moving contact engages ledges within stationary contact housing preventing the moving contact from engaging the stationary contacts. An actuator button fits over the end of the stationary contact housing. Pressing in on the actuator button forces the moving contact toward the stationary contacts, but the movement of the moving contact is restricted due to the support ledges on which the moving contact rests. The moving contact flexes until it comes into contact with both stationary contacts, thereby electrically connecting the two fixed contact elements. Connecting the two stationary contacts acts as a switch closure providing indication that the driver has pressed the O/D button. The location of the O/D button on the end of the switch housing provides easy differentiation between the AUTO(+) and AUTO(−) buttons and the O/D button so that a driver familiar with the vehicle is unlikely to confuse the three buttons.

Signal information regarding the state of the AUTO(+), AUTO(−) and O/D switch contacts is carried from the switch assembly to a transmission controller mounted elsewhere on the vehicle over a pair of signal wires. The signal wires are carried to the switch assembly through the inner diameter of the tubular gearshift stalk. The hollow stalk is open at the end opposite the steering column, and with the switch housing mounted to the end of the stalk the interior portion of the stalk communicates with the internal portion of the switch assembly, allowing the two signal wires to enter the switch housing. Upon entering the switch assembly, the two signal wires are connected to a multiplexing flexible circuit. The multiplexing flexible circuit provides a resistive network which includes the switch contacts from the AUTO(+), AUTO(-) and O/D operators. With none of the switch contacts closed, the input voltage signal is routed through a first resistive path between the input signal wire and the output signal wire. Closure of any of the three switch contacts will route the input reference voltage through one of three different resistive paths so that the current output on the signal wire will vary depending on the state of the various switch contacts. Each path includes resistors sized to produce a specific amount of output current on the output signal for a given switch contact configuration. Thus, by monitoring the current on the output signal wire, it can be determined which switch contact within the assembly has been actuated.

When assembled, the preferred embodiment, as disclosed herein, provides a multi-function switch for use in conjunction with an automatic transmission electronic override system. The switch housing is configured to slide over the end of a steering column mounted gearshift stalk such that the switch housing and the stalk can be manipulated together in order to place the transmission in the proper driving mode. Three separate switch contacts and switch operators are incorporated within the switch housing. In the preferred embodiment, these three switches represent AUTO(+), AUTO(-), and O/D, closure of any of these contacts indicates that the driver has selected the corresponding AUTO (+), AUTO(-), or either selected or deselected the O/D function. The switch assembly provides a single multiplexed output signal wherein various incremental signal current levels indicate whether any of the switch contacts have been activated, and if so, which one. The output signals of the preferred embodiment relate to controlling an automatic transmission with electronic override, however is should be clear that the output signals developed by the switch assembly can be put to use in any other application requiring momentary switch closure indication.

BRIEF DESCRIPTION OF THE DRAWINGS

FIG. 1 is a perspective view of a stalk mounted multi-function switch according to the preferred embodiment of the present invention;

FIG. 2 is an exploded perspective view of the stalk mounted multi-function switch assembly shown in FIG. 1;

DETAILED DESCRIPTION OF THE PRESENTLY PREFERRED EMBODIMENTS

Figure 3:
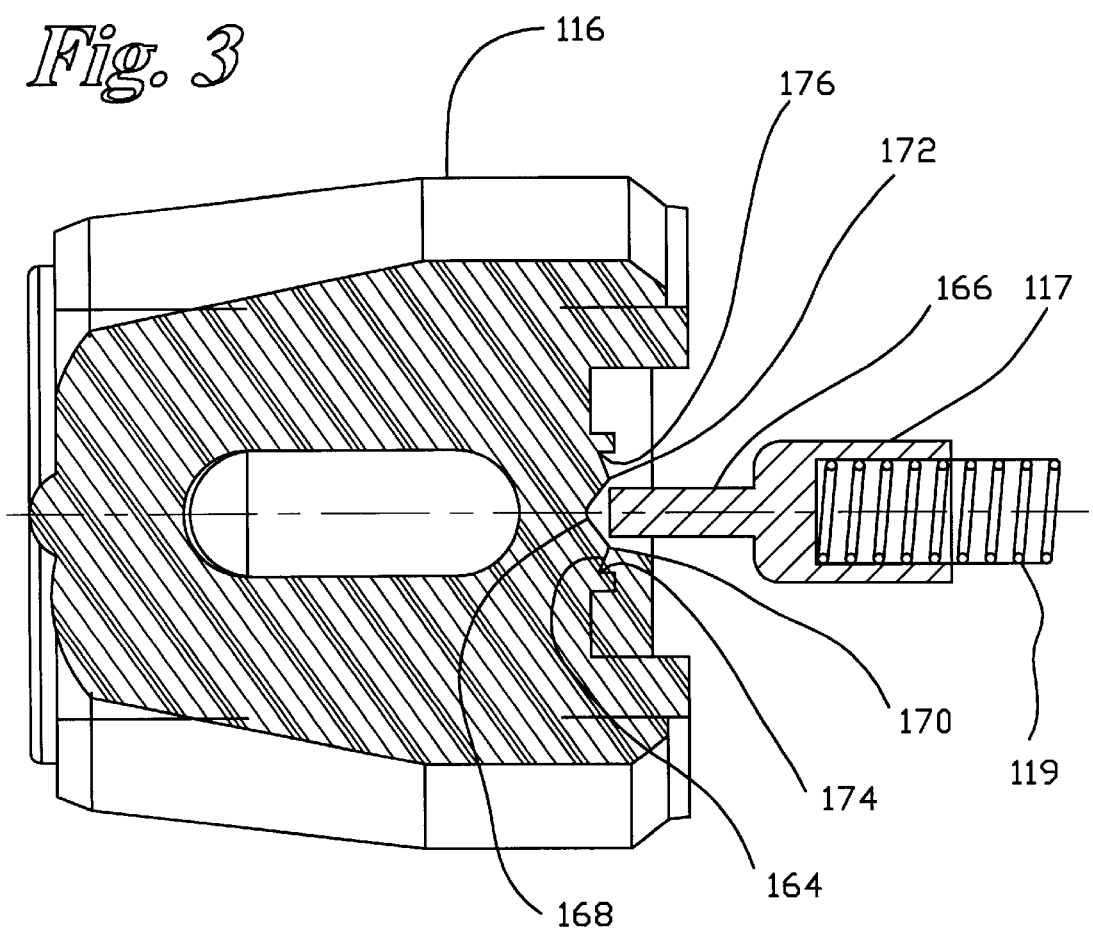
FIG. 3 is a section view of a modified rocker switch shown in FIG. 2 showing a cam surface and detent plunger mechanism for giving the AUTO(+) and AUTO(-) switch actuator a proper switch feel to provide a positive indication to the driver when the switch contacts are actuated.
Figure 4:
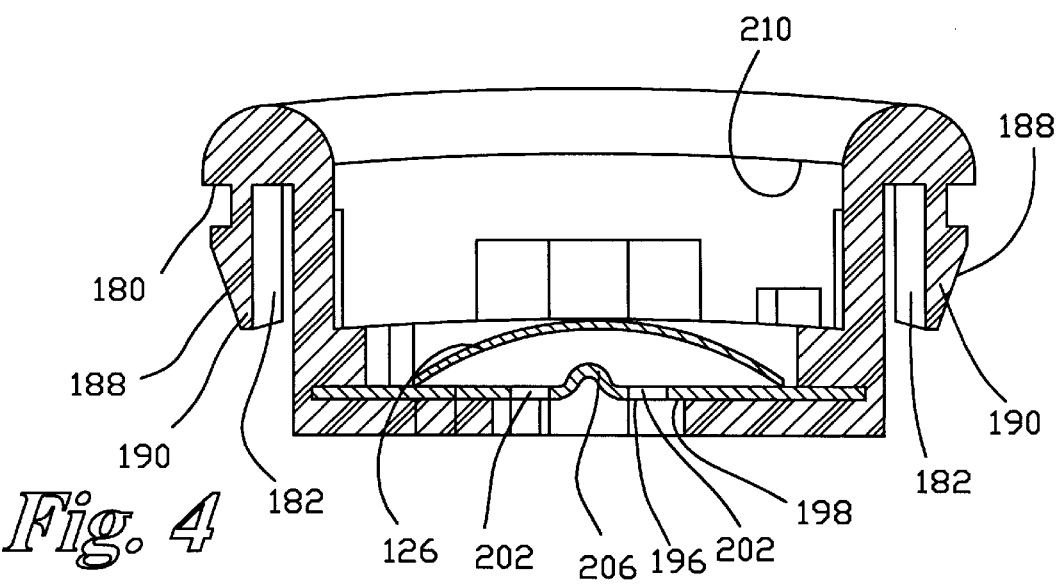
FIG. 4 is a section view of the fixed contact housing having the moving contact properly seated therein.
Figure 5:
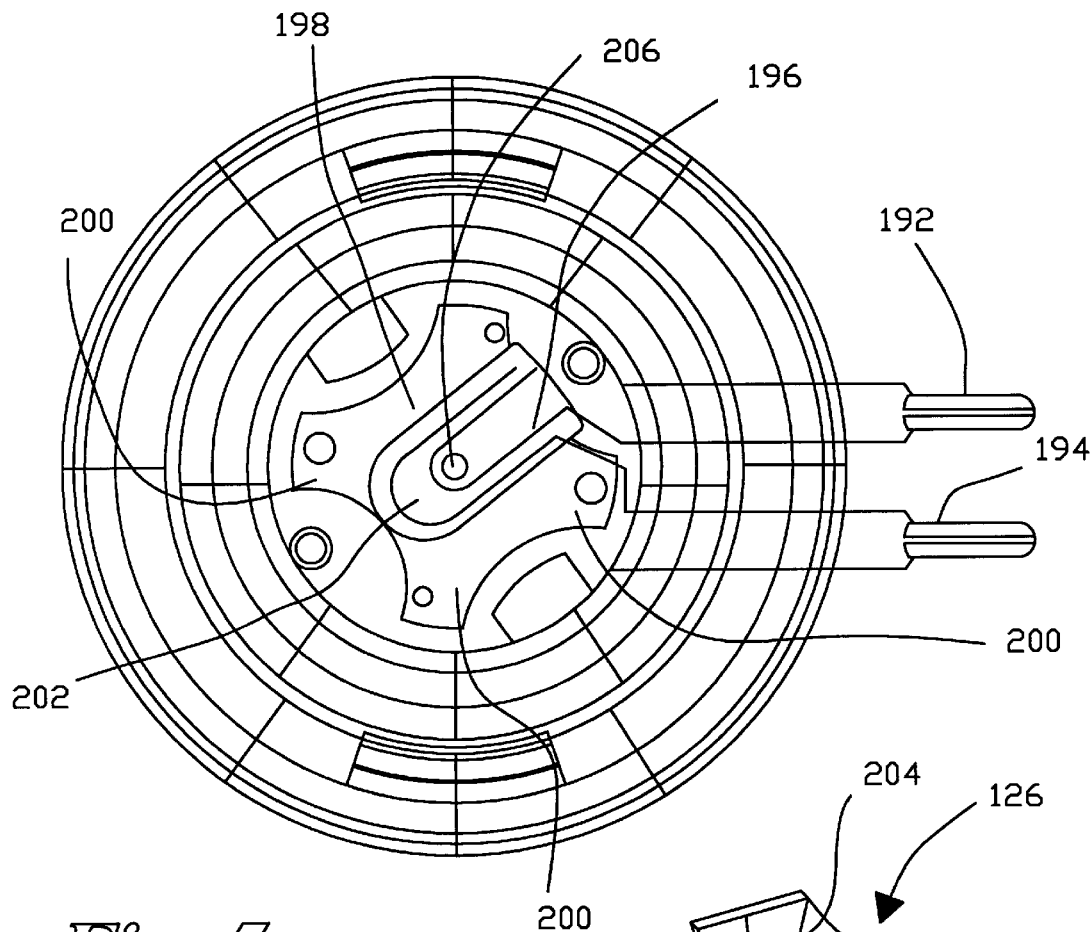
FIG. 5 is an end view of the fixed contact housing showing the fixed signal and ground contacts contained therein.
Figure 6:
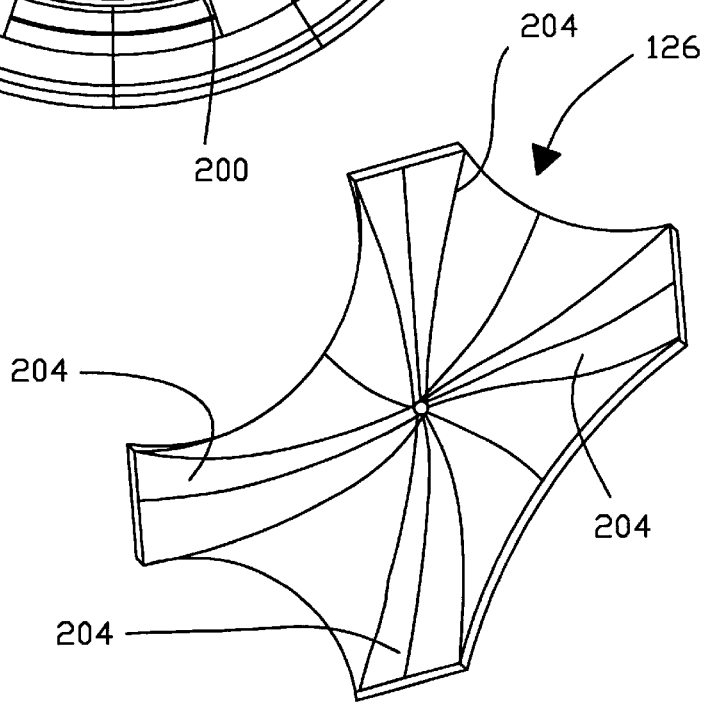
FIG. 6 is a perspective view of the O/D button moving contact.

The present invention is for a multi-function switch assembly configured to mount on a stalk style control operator extending from a steering column for use in automotive applications.

FIG. 1 shows a perspective view of a multi-function switch according to the preferred embodiment of the present invention. FIG. 1 shows a switch assembly 100 fully assembled and mounted on the end of a gearshift stalk 102. The external features of switch assembly 100 visible in FIG. 1 include a housing 104; an aperture 106 formed in a side wall of housing 104 and communicating with an internal cavity formed within the housing 104; a thumb switch operator 108 extending through aperture 106; and an O/D button 110 located at the end of housing 104. Thumb switch 108 acts as the operator for both the AUTO(+) switch contact and the AUTO(-) switch contact housed within switch assembly 100. When thumb switch 108 is actuated in the clockwise direction as indicated by the (+) arrow in FIG. 1, the AUTO(+) contact closes, generating an output signal to be sent to the vehicle's transmission controller indicating that the driver is requesting additional torque output from the transmission. Likewise, when thumb switch 108 is rotated in the counter clockwise direction, as indicated by the (-) arrow in FIG. 1, the AUTO(-) contact closes, thereby generating an output signal alerting the transmission controller that the driver is requesting less torque output and higher efficiency from the transmission. The O/D button 110 at the end of housing 104 actuates a single momentary switch contact which generates an output signal indicating that the driver is selecting or deselecting the over drive feature of the transmission.

Referring now to FIGS. 1 and 2, FIG. 2 depicts an exploded perspective view of switch assembly 100 showing all of the major internal and external components of switch assembly 100. Included in FIG. 2 are the gearshift stalk 102 (shown here in its full extent) and inner switch housing member 112 and outer knob 114 which together comprise the switch housing 104 of FIG. 1. Internal components of switch assembly 100 mount within a cavity formed inside the two piece housing, these internal components include a modified rocker switch actuator 116 to which thumb lever 106 is attached; two rubber domed tactile switches 118, 120, and a multiplex flexible circuit 122. A fixed contact housing 124 is insertable into a cavity formed in the end of knob 114, and a moving contact 126 is insertable into a cavity formed in the end of fixed contact housing 124. Finally, the end of the assembly is sealed by the O/D button 110 with a spacer in the form of a nipple 128 inserted into a projection on the inside face of the O/D button 110.

Turning back to gearshift stalk 102, it can be seen that the stalk is formed as a tubular shaft having an interstitial axial void extending the fall length of the shaft. The length of gearshift stalk can be considered as two separate segments, a first external segment 130 and a second internal segment 132. The external segment 130 has a larger diameter than the internal segment 132, and is configured to extend between the steering column and switch housing 104. The smaller diameter internal stalk segment 132 is configured to be insertable into switch housing 104, having a knurled section 136 formed thereon to provide a secure interference fit with the knob 114 when switch assembly 100 is assembled.

Inner housing 112 is formed of an outer shell wall 140, and is generally hollow except for a circular inner wall structure 142 which defines an internal axial bore 144. Internal bore 144 is configured to receive the smaller diameter internal segment 132 of stalk 102. The stalk 102 can be inserted into inner housing 112 until the larger diameter external portion 112 abuts inner housing member 112. In this position, the innermost knurled portion 134 engages the inner surface of circular wall 142 forming an interference fit with the inner wall structure 142 to firmly secure inner housing member 112 to stalk 102.

As noted, inner housing member 112 is generally hollow except for the circular wall structure 142 formed around the axis of the housing. The ring shaped void formed between the outer wall 140 and the inner wall 142 of inner housing 112 accommodates a portion of the switch mechanism for generating the AUTO(+) and AUTO(-) signals. Modified rocker switch actuator 116 occupies approximately one half of the internal space within inner housing member 112. The modified rocker switch actuator 116 is generally shaped as a semicircular cylinder having a curved outer surface 148 which is generally congruent with the inner surface of the outer wall 140 of inner housing member 104. An inner mounting ring 152 is formed around the axial center of rocker switch actuator 116 corresponding to the axial center of the housing 104. Mounting ring 152 aligns with the circular inner wall structure formed within inner housing member 104 such that the smaller diameter internal segment 132 of stalk 102 can be inserted therethrough. With this arrangement, rocker switch actuator 116 slides over stalk 102 until it fits snugly into inner housing 112. Because the inner surface of wall 140 is the same shape as the curved surface 148 of rocker switch actuator 116, outer wall 140 forms a mating engagement with the actuator while leaving the rocker switch actuator 116 free to rotate therein. Thumb lever 108 extends outward from the curved surface 148 beyond the outer dimension of housing 104. A notched section 154 is formed in outer wall 140 of inner housing member 112, and forms a portion of aperture 106. A corresponding notch 115 formed in knob 114 completes the aperture, allowing thumb lever 108 to extend beyond housing 104. Thumb lever 108 allows an operator to manually rotate the rocker switch actuator 116, with the amount of rotational movement of the actuator 116 being limited by the width of aperture 106 and internal stops (not shown) within knob 114.

Because modified rocker switch actuator 116 is the shape of one half of a cylinder, the actuator only occupies approximately one half of the annular void within inner housing member 112 extending around gearshift stalk 102. In the remaining void, behind the rocker switch 116, two rubber domed tactile switches 118, 120 are mounted to a rigid circuit board 159. First tactile switch 118 corresponds to the AUTO(+) contact, and second tactile switch 120 corresponds to the AUTO(-) contact. The truncated portion of cylindrical rocker switch actuator 116 forms upper and lower shoulders 156, 158 respectively. First tactile switch 118 is mounted behind upper shoulder 156, and second tactile switch is mounted behind lower shoulder 158. The two tactile switches are located such that when the rocker switch actuator 116 is rotated in the clockwise direction (initiated by an upward movement of thumb lever 108) upper shoulder 156 moves toward first switch 118, engaging a plunger (not shown) which actuates the switch. Similarly, when thumb lever 108 is pressed downward, the rocker switch actuator 116 rotates counterclockwise and lower shoulder 158 moves toward second switch 120, engaging a plunger which actuates the second switch 120. It should be clear, that when rocker switch actuator 116 is rotated in the clockwise direction and upper shoulder 156 is rotated toward first tactile switch 118, lower shoulder 158 is simultaneously rotated away from second tactile switch 120. Likewise, as rocker switch actuator is rotated counterclockwise and lower shoulder 158 actuates second tactile switch 120, upper shoulder 156 is simultaneously rotated away from first tactile switch 118. Therefore, only one switch, either first switch 118 or second switch 120 can be operated at one time. Also, the motions required to actuate first switch 118 and second switch 120 are mutually opposing: an upward thrust of thumb lever 108 to actuate first switch 118, and an downward thrust to actuate second switch 120, making it easy to differentiate which switch is being operated. Thus, when the driver of the vehicle in which switch assembly 100 is mounted presses upward on thumb lever 108, the AUTO(+) contact closes requesting more torque output from the transmission. When the driver presses down on thumb lever 108, the AUTO(-) contact closes requesting less torque.

Detent plunger 117 and detent spring 119 are provided to supply the driver with a positive mechanical indication when the AUTO(+) and AUTO(-) switches have been actuated. The mechanical indication provided is in the form of a snapping or "click" sensation developed when rocker switch actuator 116 has been rotated sufficiently far enough in either direction to actuate either the first rubber domed tactile switch 118 or the second rubber domed tactile switch 120. When switch assembly 100 is fully assembled, detent plunger 117 is positioned parallel to the major axis of switch housing 104 between the rocker switch actuator 116 and an inner surface of knob 114. Detent spring 119 is compressed within an internal cavity 162 formed in the back of detent plunger 117, biasing the detent plunger against an inner surface of rocker switch actuator 116. As can be seen in the section view of FIG. 3, rocker switch actuator 116 is formed with a profiled cam surface 164. The operative end 166 of the detent plunger 117 rides along the cam surface 164, and, due to the biasing force of detent spring 119, provides physical resistance opposing rotational motion of rocker switch actuator 116.

The profile of cam surface 164 can be described as a series of peaks and troughs. The center and deepest trough 168, corresponds to the neutral position of rocker switch actuator 116, when thumb lever 108 is being forced neither up or down. In this position the operative end 166 of the detent plunger 117 rests firmly at the bottom of the center trough 168 as pictured in FIG. 3. In order to rotate rocker switch actuator 116, sufficient force must be applied to thumb lever 108 to overcome the bias force exerted by detent spring 119. As the rocker switch actuator 116 is rotated in either direction, the sloped sides of trough 168 will force the plunger out of the trough toward either of the two peaks 170 or 172, compressing detent spring 119 along the way. Because the spring force generated by detent spring 119 increases as the spring is compressed, the force necessary to rotate rocker switch actuator 116 likewise increases as the detent plunger nears either of the two peaks 170 or 172. As can be seen in the cam profile, peaks 170 and 172 are fairly sharp and cross directly into second and third troughs 174 and 176 respectively. Once the detent plunger crosses one of the peaks, the bias force of the spring tends to force the detent plunger down the opposite side the peak into the second or third trough. Thus, as soon as the plunger crosses a peak the rotational force necessary to surmount the peak is suddenly no longer necessary, and the rocker switch actuator snaps or "clicks" forward to the fully rotated position where the detent plunger is resting at the bottom of either the second or third trough 174, 176. The two rubber domed tactile switches are positioned such that the switches are made (the two incoming leads are switched together) right after the point when the detent plunger crosses the two peaks. The first rubber domed tactile switch 118 (AUTO(+)) is actuated as the detent plunger 117 crosses the first peak 170, and the second rubber domed tactile switch (AUTO(−)) is actuated as the detent plunger 117 crosses the second peak 172. Thus, the snap action or "click" provides a mechanical indication that the respective switch contact has been actuated. Once the external force acting against thumb lever 108 has been removed, the rubber dome of the first or second rubber domed tactile switch 118, 120 provides a biasing force against the respective upper or lower shoulder 156, 158 of rocker switch actuator 116, tending to force the actuator back to the center position. Second and third troughs 174, 176 are fairly shallow, such that only a minimal amount of force is necessary to compress detent spring 119 and force detent plunger 117 back over peaks 170 or 172 in the reverse direction. Once the detent plunger passes back over peaks 170 or 172, the biasing force of the detent spring 119 forces the detent plunger 117 back to the bottom of the center trough 168, centering rocker switch actuator 116 in the neutral position.

Referring back to the rubber domed tactile switches 118, 120 in FIG. 2, two separate electrical leads are wired to each of the two switches. When the switches are actuated, the switch contacts electrically connect the two leads. The two leads wired to first tactile switch 118 as well as the two leads wired to second tactile switch 120 are connected to conductive traces formed on a flexible substrate 212 attached to the rigid printed circuit board 159. The printed circuit board 159 and flexible substrate 212 form the multiplex flexible circuit 122. The multiplex flexible circuit 122 occupies the space behind modified rocker switch actuator 116, and extends into the internal cavity of outer knob 114 when the entire housing is fully assembled. The operation of the multiplex circuit is discussed in more detail with regard to FIG. 7 below.

Though the inner portions of outer knob 114 are not visible in FIG. 2, the inner structure of knob 114 is similar to that of inner housing 112, in that knob 114 is generally hollow except for an internal circular inner wall structure which defines an axial bore. The axial bore within knob 114 is configured to receive the smaller diameter internal segment 132 of gearshift stalk 102. During the assembly process, outer knob 114 slides over stalk 102 until it is brought into abutting relation to inner housing member 112, enclosing all of the internal switch components within the unified housing 104. Small clips 160 for securing knob 114 to inner housing 112 extend from the inner circumferential edge of knob 114. As the inner housing 112 and knob 114 are brought together, clips 160 engage corresponding grooves 162 formed in inner housing 112. Once engaged, the clips and grooves form a positive latch preventing the inner housing 112 and knob 114 from being separated and preventing rotational displacement between the two pieces, thus forming the single unitary switch housing 104. With inner housing member 112 and knob 114 so conjoined, and with the internal stalk segment 132 fully inserted therein, second knurled portion 136 engages the inner surface of the axial bore within knob 114, forming an interference fit therebetween. The two knurled portions 134, 136 acting against the internal bores of both the inner housing member 112 and knob 114 secure the entire assembly in place on the end of shaft 102.

Referring now to FIGS. 1, 2, 4, 5, and 6 the structure of the O/D button will now be described. As seen in FIG. 2, the outside end of knob 114 is formed with an opening 178 configured to receive fixed contact housing 124. The O/D button fixed contact housing 124 is shaped to slide into opening 178. When the fixed contact housing is fully inserted, an annular lip 180 extending around the circular outer end of the fixed contact housing 124 engages the outer wall 186 of knob 114, forming a seal around opening 178. Annular lip 180 includes latching fingers 182 which extend in the direction of insertion of fixed contact housing 124. Locking grooves 184 are formed in the inner surface of the wall 186 of knob 114, disposed around opening 178. The latching fingers 182 depending from annular lip 180 are formed with tapered hooks 188 configured to engage the locking grooves 184. As the fixed contact housing is inserted into opening 178, the angled surfaces 190 of tapered hooks 188 engage outer wall 186 of knob 114 causing the latching fingers to flex inward. When the hooks 188 at the end of the fingers reach the locking grooves 184, the latching fingers 182 spring back to their original position, engaging the locking grooves 184 to hold the fixed contact housing 124 in place in both the linear and angular direction.

The fixed contact housing 124 is formed with two rigid switch leads 192, 194 which are connected to two separate switch contact elements within the housing. As will be discussed in more detail with regard to the multiplex flexible circuit 122, when the fixed contact housing is fully inserted into knob 114, the two rigid contacts mate with a connector located on the flexible circuit 122 so that the O/D button acts as an input to the multiplex circuit. The two fixed contact elements themselves are best seen in the end view of the fixed contact housing 124 shown in FIG. 5. A first contact element 196 represents the signal contact, this contact is connected to the signal lead 192 which receives a reference voltage from the multiplex circuit 122 . A second contact element 198 is generally U-shaped but having squared off shoulders 200, and mostly surrounds the signal contact element 196, the two contact elements being separated by a small gap 202. The second contact element 198 represents the ground contact, and is connected to earth ground through ground lead 194 and multiplex circuit 122. As their name implies, the two contact elements 196, 198 are fixed within the fixed contact housing 124 and are stationary contacts.

The O/D switch is closed by bridging the gap 202 between the two fixed contact elements with the electrically conductive moving contact element 126. The moving contact 126 is shown in perspective view in FIG. 6., and in section view, seated within fixed contact housing 124, in FIG. 4. Moving contact 126 is arced, or domed shaped, having four radial legs 204 at each corner. The position of the legs 204 correspond to the squared shoulders of the grounded fixed contact 198, such that when the moving contact 126 is seated within the fixed contact housing 124, legs 204 physically contact shoulders 198, thereby forming a direct path to ground through moving contact 126. Fixed signal contact 196 is formed with a slight protuberance 206 which is located directly in the center of fixed contact housing 124, and opposite the dome shaped moving contact 126 at the point where the moving contact is furthest from signal contact element 196. The O/D switch is closed by applying a downward force on the top of moving contact element 126 such that the contact is deformed, the downward force tending flatten the moving contact 126 to the point where the moving contact physically engages the protuberance 206 formed in the fixed signal contact element 196. By engaging the signal contact element 196, and with the leg portions 204 of the moving contact contacting ground contact element 198, moving contact 126 bridges the gap between the two fixed contact elements, forming an electrical connection therebetween and effectively closing the O/D switch.

Turning back to FIG. 2, the remainder of the O/D button assembly is completed by nipple 128 and the O/D button 110 itself. O/D button 110 snaps into recessed pocket pocket formed in contact housing 124 with nipple 128 disposed between button actuator 110 and moving contact 126. Retaining fingers 208 formed on the edge of button 110 engage an internal ridge 210 (see FIG. 4) within fixed housing 124 to retain the button within the fixed contact housing 124 while allowing for the linear travel of the button when the button is actuated. Nipple 128 performs two functions. First, in the normal state when button 110 is not being depressed, nipple 128 acts to stabilize moving contact 126, holding the moving contact firmly against ground contact element 198 and preventing the moving contact from rattling. Second, the nipple acts as a spacer translating the motion of O/D button 110 to the moving contact 126. Thus, when button 110 is depressed, nipple 128 acts against moving contact 126, providing the actuating force to deform the moving contact and close the switch.

Mechanical indication that the switch has been actuated is provided by moving contact 126 itself. Because of the domed shape of moving contact 126, a finite amount of force is required to overcome the resistance of the moving contact and flatten the contact against the signal contact element 196. Moving contact 126 is sized such that there is insufficient space within the fixed contact housing 124 for the moving contact to be compressed to a completely flat state, therefore, once a certain force threshold is reached, the domed moving contact tends to snap in the opposite direction so that the arc of the dome becomes concave rather than convex when viewed from button actuator 110. This reversing action takes place near the point when the moving contact 126 makes physical contact with the fixed signal contact 196, and provides the driver of the vehicle with a mechanical indication that the switch has been actuated. When the O/D button 110 is released, elastic forces within moving contact 126 cause the contact to snap back to its original position and open the switch contact.

Figure 7:
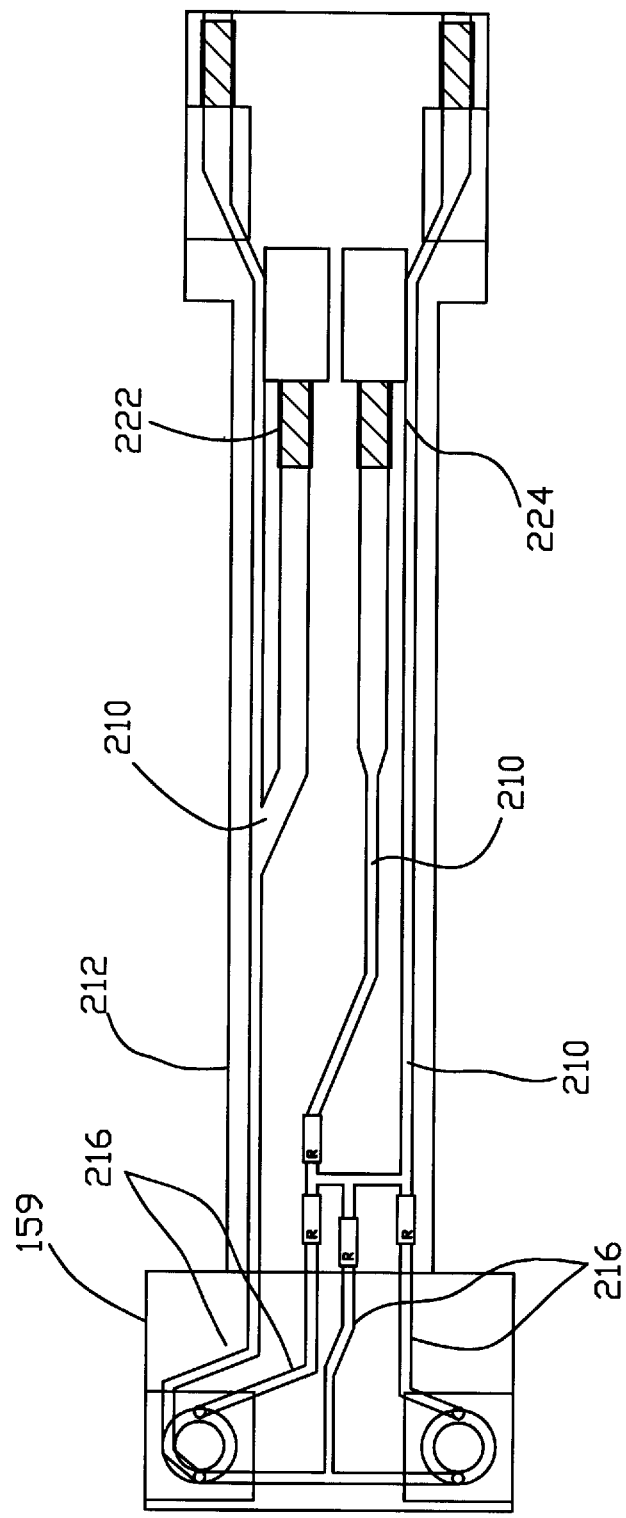
FIG. 7 is a circuit diagram of the multiplexing flexible circuit shown in FIG. 2.
Figure 8:
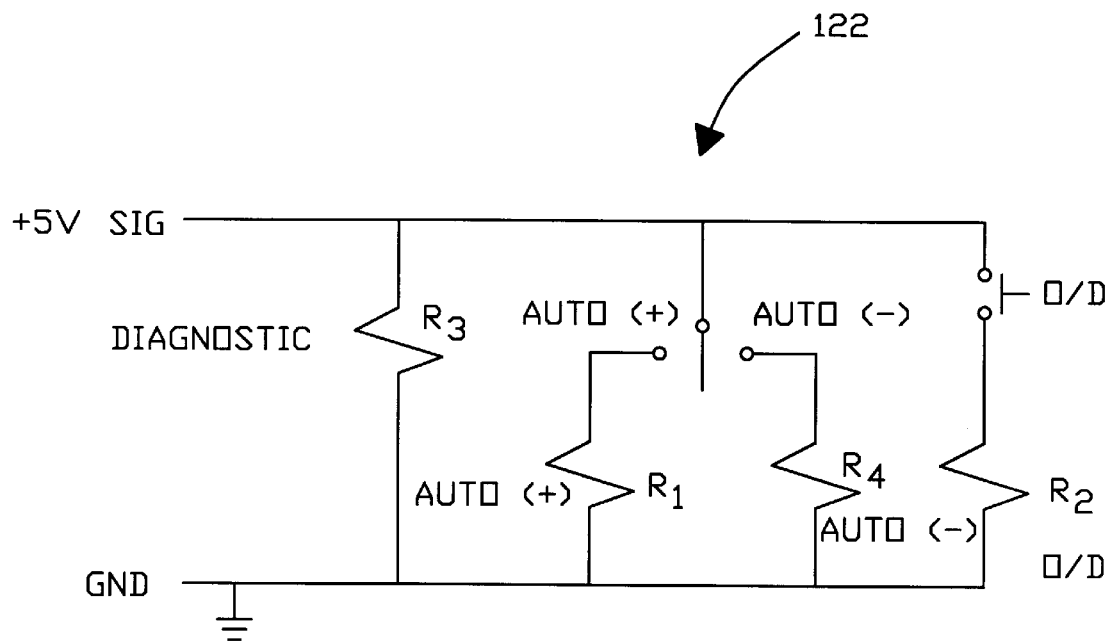
FIG. 8 is a schematic diagram of the multiplexing circuit of FIG. 7.

Having described the operation of the various switch contacts, the multiplex flexible circuit 122 will now be described. A diagrammatic representation of multiplex flexible circuit 122 is shown in FIG. 7, and a schematic diagram of the multiplex circuit is shown in FIG. 8. The purpose of multiplex flexible circuit 122 is to generate a single output signal from which the state of each of the AUTO(+), AUTO(-), and O/D switch contacts can be determined. FIG. 7 shows the physical layout of multiplex flexible circuit 122. Conductive traces 210 are formed on a flexible substrate 212 to which resistors $R_1$–$R_4$ are adhered in the pattern shown. A first end of flexible substrate 212 is attached to the rigid printed circuit board 159 supporting the two rubber domed tactile switches 118, 120 for developing the AUTO(+) and AUTO(-) signals. The conductive traces 210 formed on flexible substrate 212 are mated to conductive traces 216 formed on printed circuit board 214. Conductive traces 216 act as the input leads to rubber domed tactile switches 218, 220. At the opposite end of flexible substrate 212, a series of four connectors 218, 220, 222, and 224 are bonded to the substrate, and electrically connected to the various conductive traces 210 as shown. Connectors 222 and 224 are configured to receive the rigid switch leads 192, 194 which protrude from the fixed contact housing 124. Connectors 218 and 220 represent the SIG and GND connectors respectively. Thus, when the O/D button is assembled and the fixed contact housing 124 is inserted into the opening 178 in the end of knob 114, the rigid SIG lead 192 slides into connector 222, and the rigid GND lead slides into connector 224, thereby connecting the O/D switch contact to the multiplex flexible circuit 122. A pair of external signal wires, one grounded, and one carrying a reference voltage signal from the transmission controller, or elsewhere in the vehicle, are threaded through the axial void within the gearshift stalk 102 and they enter the internal cavity within housing 104 through an opening 226 in the end of the stalk. Within the housing 104, the reference voltage lead is connected to connector 218, and the grounded lead is connected to connector 220, thereby supplying the requisite voltage reference and ground signals to multiplex flexible circuit 122.

The operation of multiplex circuit 122 implemented by the flexible circuitry depicted in FIG. 7 is best understood by referring to the schematic diagram if FIG. 8. The conductive traces 210, 216, resistors $R_1$–$R_4$ and the AUTO(+), AUTO (-), and O/D switch contacts shown in FIG. 7 comprise the resistive network shown in FIG. 8. The two external leads, SIG and GND are supplied to the multiplex circuit 122 from a source external to switch assembly 100. A reference voltage reference is impressed on the SIG lead, and the GND lead is grounded. The DIAGNOSTIC resistor $R_3$, is connected directly between the SIG and GND leads, and provides a current path to ground when AUTO(+), AUTO(-) and O/D switch contacts are all open. $R_3$ is much larger than the other resistors, so that very little current flows in the signal lines when the switch contacts are open. As can be seen from FIG. 8, if the O/D switch contact is closed, $R_2$ will be connected in parallel with $R_3$, thererfore, the input resistance to multiplex circuit 122 becomes the resultant parallel combination of resistors $R_3$ and $R_2$. Similarly, when the AUTO(+) contact is closed, $R_1$ will be connected in parallel with $R_3$, and when the AUTO(-) contact is closed, $R_4$ is connected in parallel with $R_3$. $R_1$, $R_2$, and $R_4$ all have different values, so that the input resistance to the multiplex circuit will be different depending on which resistor is connected in parallel with $R_3$. This results in four distinct current levels drawn by the multiplex circuit 122, with each current level corresponding to a different switch contact being closed or no switch being closed at all. By monitoring the current drawn by the multiplex circuit it is possible to determine the status of the AUTO(+), AUTO(-) and O/D switches.

In the preferred embodiment, the reference voltage supplied to the SIG lead is +5 V and the GND lead is grounded. $R_1 = 1820\Omega$, $R_2 = 5230\Omega$, $R_3 = 18700\Omega$, and $R_4 = 475\Omega$. Therefore, the DIAGNOSTIC current, when all switch contacts are closed will be 0.27 mA. The O/D signal current when the O/D contact is closed will be 1.22 mA. The AUTO(+) current, when the AUTO(+) contact is closed will be 3.0 mA. And finally, the AUTO(-) current, when the AUTO(-) contact is closed will be 10.8 mA.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A multi-function switch assembly for mounting to the end of a tubular member and providing control information to external devices via control wires contained within said tubular member, said switch assembly comprising:
a housing defining at least one internal cavity for mounting switch components therein, and also defining an internal bore configured to receive said tubular member, and communicating with said at least one internal cavity, and having an outside end;
first, second, and third switches mounted within the at least one internal cavity defined by said housing;
a bi-directional switch actuator mounted within the at least one internal cavity defined by the housing for actuating the first and second switches, the first and second switches being positioned such that when the switch actuator is moved in a first direction, the first switch is actuated, and when the switch actuator is moved in a second, opposite direction, the second switch is actuated;
a linear switch actuator for actuating the third switch; and
multiplex circuitry electrically connected to the first, second, and third switches, the multiplex circuitry generating a single electrical signal from which an operative open or closed switch state of each switch can be determined.

2. The multi-function switch assembly of claim 1 wherein the bi-directional switch actuator comprises a modified rocker switch actuator in the shape of a semi-circular cylinder having a relatively flat side along the axial length thereof, and having a circular mounting ring configured to receive said tubular member allowing bi-directional angular rotation of said rocker switch actuator about the axis of said tubular member, the relatively flat side of the rocker switch actuator forming first and second shoulders for actuating said first and second switches respectively.

3. The multi-function switch assembly of claim 2 wherein the first and second switches are domed tactile switches, with the first switch mounted directly opposite the first rocker switch actuator shoulder, and the second switch mounted directly opposite the second rocker switch actuator shoulder.

4. The multi-function switch assembly of claim 2 further comprising a detent mechanism disposed between an inner wall of the housing and the rocker switch actuator, the detent mechanism providing a transient resistance opposing rotation of the rocker switch actuator, the resistance being reduced once the rocker switch actuator has been rotated a predefined amount in either angular direction.

5. The multi-function switch assembly of claim 4 wherein the detent mechanism comprises:
a detent plunger having a first operative end configured to ride along a surface of the rocker switch actuator, and a second end forming an internal cavity;
a detent spring disposed within the cavity formed in the second end of the detent plunger, the spring being compressed between the inner wall of the housing and the detent plunger, and biasing the detent plunger against the rocker switch actuator; and
the surface of the rocker switch actuator which the detent plunger is biased against comprises a cam profile including two peaks where the profile extends toward the detent plunger, the two peaks separating a series of three troughs where the profile recedes away from the detent plunger.

6. The multi-function switch assembly of claim 1 wherein the linear actuator comprises a depressible button positioned in the outside end of the housing, and the third switch comprises:
first and second stationary fixed contacts electrically separated from one another by a small gap; and
a moving contact for forming an electrical connection between the first and second fixed contacts, the moving contact being configured such that the depressible button, when depressed, acts against the moving contact, forcing the moving contact against both the first and second fixed contacts.

7. The multi-function switch assembly of claim 6 wherein the first fixed contact generally surrounds the second fixed contact, and the second fixed contact is formed with a slight protuberance extending in the direction of the moving contact, the moving contact is dome shaped, having legs extending therefrom forming a base, the legs being configured to rest against the first moving contact, the domed shape of the moving contact being deformed when acted upon by said depressible button such that a center portion of the dome shaped moving contact is brought into contact with the protuberance extending from said second fixed contact thereby bridging the gap between the first and second fixed contacts, and creating an electrical connection therebetween.

8. The multi-function switch assembly of claim 1 wherein said output generating circuitry comprises a resistive network having a plurality of resistive paths, each path forming a unique resistive value relative to every other path, said control wires providing an input voltage to the output generating circuitry, and said first, second, and third switches acting to switch the input voltage across the various individual resistive paths such that a distinct current level flows through said control wires for every combination of operative switch states of said first, second, and third switches.

9. The multi-function switch assembly of claim 8 wherein said plurality of resistive paths are formed on a flexible substrate.

10. A switch assembly including three separate switches, for mounting to the end of a tubular member and providing a control signal to external devices indicating the open and closed state of each of said three switches, the control signal being carried over a pair of signal wires contained within said tubular member, said switch assembly comprising:
a housing configured to mount to the end of said tubular member, and enclosing said three switches;
a multiplex circuit including multiple resistive paths mounted within said housing for generating said control signal, said three switches acting as inputs connecting various said resistive paths such that the control signal generated by the multiplex circuit supplies a distinct output voltage signal over said pair of signal wires for every combination of the open and closed switch states for each of the three switches.

11. The switch assembly of claim 10 wherein the first and second of said three switches are operated by a rotating switch actuator mounted within the housing, the first and second switches being positioned such that when the rotating actuator is rotated in a first angular direction, the first switch is actuated, and when the rotating actuator is rotated in a second opposite angular direction, the second switch is actuated.

12. The switch assembly of claim 11 wherein the rotating switch actuator comprises a modified rocker switch actuator in the shape of a semi-circular cylinder having a relatively flat side along the axial length thereof, and having a circular mounting ring configured to receive said tubular member allowing bi-directional angular rotation of said rocker switch actuator about the axis of said tubular member, the relatively flat side of the rocker switch actuator forming first and second shoulders for actuating said first and second switches respectively.

13. The switch assembly of claim 12 wherein the first and second switches are domed tactile switches, with the first switch mounted directly opposite the first rocker switch actuator shoulder, and the second switch mounted directly opposite the second rocker switch actuator shoulder.

14. The switch assembly of claim 10 wherein the third switch is operated by a linear switch actuator mounted in an end of the housing.

* * * * *